US009826340B2

(12) United States Patent
Choi

(10) Patent No.: US 9,826,340 B2
(45) Date of Patent: Nov. 21, 2017

(54) METHOD FOR TRANSMITTING DATA AND ELECTRONIC DEVICE USING THE SAME

(71) Applicant: Samsung Electronics Co., Ltd., Gyeonggi-do (KR)

(72) Inventor: Jungwook Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/923,821

(22) Filed: Oct. 27, 2015

(65) Prior Publication Data

US 2016/0119745 A1    Apr. 28, 2016

(30) Foreign Application Priority Data

Oct. 28, 2014 (KR) .................. 10-2014-0147100

(51) Int. Cl.
| | | |
|---|---|---|
| H04B 5/00 | (2006.01) | |
| H04B 7/00 | (2006.01) | |
| H04M 3/42 | (2006.01) | |
| H04W 4/00 | (2009.01) | |
| H04W 8/00 | (2009.01) | |
| H04W 76/02 | (2009.01) | |
| H04M 1/725 | (2006.01) | |

(52) U.S. Cl.
CPC ......... *H04W 4/008* (2013.01); *H04M 1/7253* (2013.01); *H04M 1/72563* (2013.01); *H04W 8/005* (2013.01); *H04W 76/025* (2013.01)

(58) Field of Classification Search
CPC .................................................... H04W 4/008

USPC ...................................................... 455/41.3
See application file for complete search history.

(56) References Cited

U.S. PATENT DOCUMENTS

| | | | | |
|---|---|---|---|---|
| 8,391,787 B2 * | 3/2013 | Kim | ................. | H04M 1/7253 |
| | | | | 455/41.1 |
| 8,396,424 B2 * | 3/2013 | Frazier | ................. | H04W 84/20 |
| | | | | 370/278 |
| 8,428,666 B2 * | 4/2013 | Kim | ................. | H04M 1/6066 |
| | | | | 379/428.02 |
| 8,554,140 B2 * | 10/2013 | Klemmensen | ... | H04N 21/43637 |
| | | | | 455/41.2 |
| 8,833,651 B2 * | 9/2014 | Brown | ................. | G06K 7/0008 |
| | | | | 235/375 |
| 8,992,088 B2 * | 3/2015 | Brahm | ................. | F16C 17/03 |
| | | | | 384/309 |
| 9,100,064 B2 * | 8/2015 | Griffin | ................. | H04B 5/02 |
| 9,565,514 B2 * | 2/2017 | Agarwal | ................. | H04W 4/008 |
| 2005/0164637 A1 * | 7/2005 | Pattabiraman | ........ | G06F 1/3203 |
| | | | | 455/41.2 |

(Continued)

FOREIGN PATENT DOCUMENTS

| | | |
|---|---|---|
| KR | 10-2009-0046112 A | 5/2009 |
| KR | 10-2013-0110789 A | 10/2013 |

*Primary Examiner* — Tilahun B Gesesse
(74) *Attorney, Agent, or Firm* — Cha & Reiter, LLC.

(57) ABSTRACT

A method for transmitting data in an electronic device is disclosed. The electronic device includes a short-range communication unit, and a controller The controller may implement the method including controlling a priority scheme of two or more other electronic devices which are paired with the electronic device, and when an event occurs, transmitting data regarding the event to at least one of the other electronic devices based on the priority scheme.

17 Claims, 10 Drawing Sheets

(56) References Cited

U.S. PATENT DOCUMENTS

| | | | |
|---|---|---|---|
| 2006/0089119 A1* | 4/2006 | Lipasti | H04W 48/12 455/410 |
| 2006/0274704 A1* | 12/2006 | Desai | H04W 72/1215 370/338 |
| 2007/0001853 A1* | 1/2007 | Otranen | G06K 7/0008 340/572.1 |
| 2007/0275746 A1* | 11/2007 | Bitran | H04W 72/0446 455/509 |
| 2008/0123610 A1* | 5/2008 | Desai | H04L 47/14 370/339 |
| 2008/0242365 A1* | 10/2008 | Rokusek | H04M 1/6075 455/41.2 |
| 2011/0070826 A1* | 3/2011 | Griffin | H04B 5/02 455/41.1 |
| 2013/0260690 A1 | 10/2013 | Cha | |
| 2014/0342762 A1* | 11/2014 | Hajdu | H04M 1/72552 455/466 |

* cited by examiner

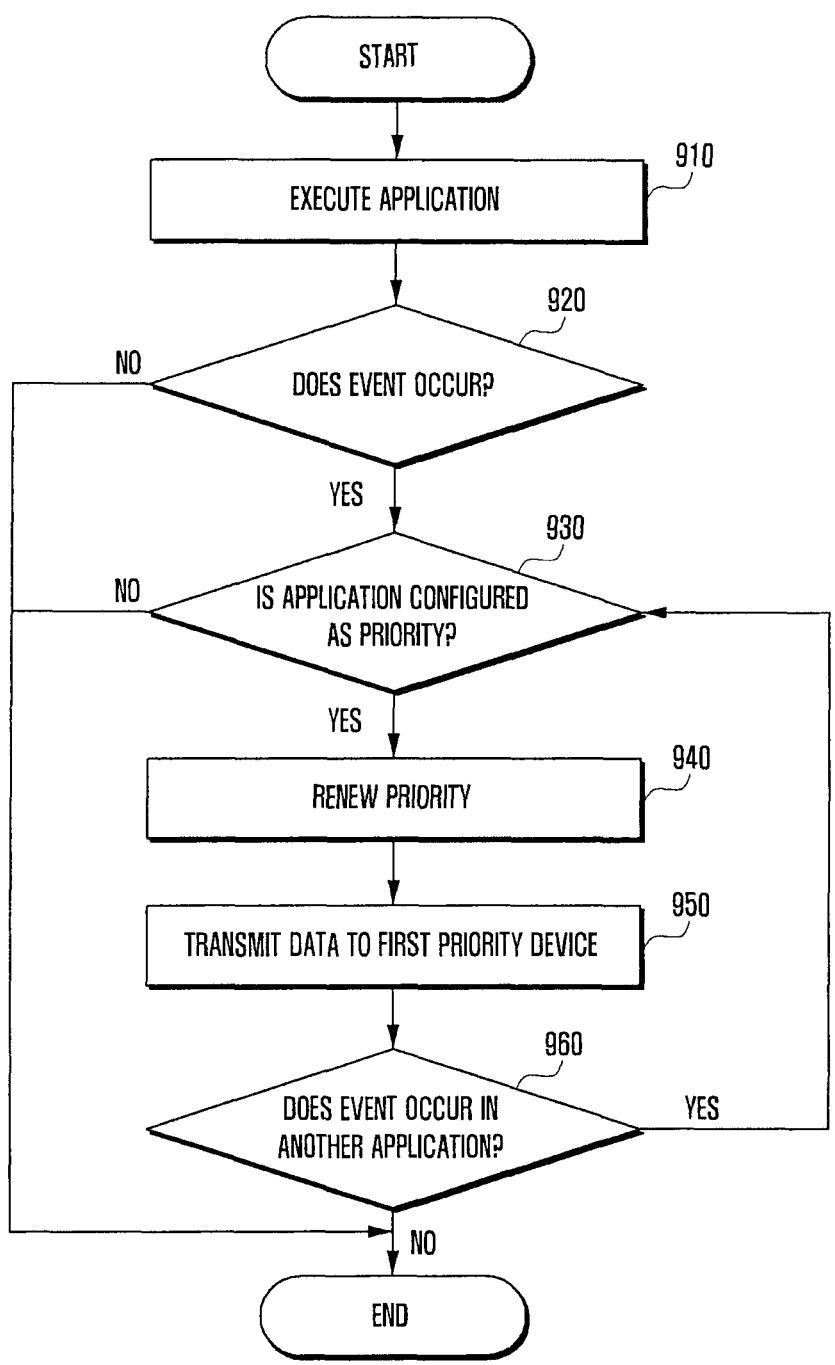

METHOD FOR TRANSMITTING DATA AND ELECTRONIC DEVICE USING THE SAME

CLAIM OF PRIORITY

This application claims priority under 35 U.S.C. §119(a) to Korean Patent Application No. 10-2014-0147100, filed on Oct. 28, 2014, the disclosure of which is incorporated by reference herein in its entirety.

TECHNICAL FIELD

The present disclosure relates to data transmission, and more particularly, to data transmission between electronic devices, on the basis of a predetermined priority.

BACKGROUND

Recent electronic devices, such as portable terminals, may simultaneously connect a plurality of electronic devices by using a Bluetooth (BT) module. This technique is referred to as multi-pairing.

Such electronic devices may perform a variety of functions, such as connecting a call, transmitting messages, reproducing multimedia data, or executing applications, in other electronic devices through multi-pairing by using Bluetooth technology. Meanwhile, when an electronic device, such as the portable terminal, receives a call while it is multi-paired, the electronic device may transmit a notification signal, such as a ring tone or vibration, to a plurality of paired devices. For example, when playing audio data, the electronic device may transmit the audio data to a plurality of paired devices. That is, even though the user does not wish to transmit the data, the electronic device may transmit the data to all of the paired devices, which may cause an inconvenience to the user. Without considering the multi-pairing with respect to a plurality of devices, an existing device may be disconnected and a new device may be connected in order to thereby selectively transmit the data.

SUMMARY

In view of the foregoing background, a number of embodiments of an electronic device are disclosed. In such embodiments, the electronic device is configured to transmit data on the basis of a priority scheme predetermined by the user. In such embodiments, data may be transmitted by the electronic device on the basis of the predetermined priority without disconnecting other multi-paired electronic devices or converting the connections thereof.

In one embodiment, an electronic device includes a short-range communication unit; a controller configured to control a priority scheme of two or more other electronic devices which are paired with the electronic device, wherein when an event occurs, the electronic device transmits data regarding the event to at least one of the other electronic devices based on the priority scheme using the short-range communication unit.

In addition, a method for transmitting data in an electronic device is disclosed. In one embodiment, the method includes: configuring a priority of two or more other electronic devices which are paired with the electronic device, and transmitting data regarding an event to at least one of the other electronic devices based on the priority scheme.

In one embodiment of the disclosure, a computer-readable recording medium may store instructions to perform a data transmission method of an electronic device, wherein the data transmission method may include: controlling a priority scheme of two or more other electronic devices which are paired with the electronic device; and when an event occurs, transmitting data regarding the event to at least one of the other electronic devices based on the priority scheme.

In one embodiment of the disclosure, the user may configure the priority scheme in advance in transmitting data from the electronic device to other multi-paired electronic devices. Thus, the user may lower the priority or may not configure the priority with respect to the electronic device to which the user does not wish to transmit data, so the user's privacy can be protected and the user's convenience may be enhanced.

BRIEF DESCRIPTION OF THE DRAWINGS

The present disclosure will be more apparent from the following detailed description in conjunction with the accompanying drawings, in which:

FIG. 9 is a flowchart illustrating a method for transmitting data on the basis of the priority corresponding to applications of an electronic device, in accordance with an embodiment of the present specification.

DETAILED DESCRIPTION

Figure 1:
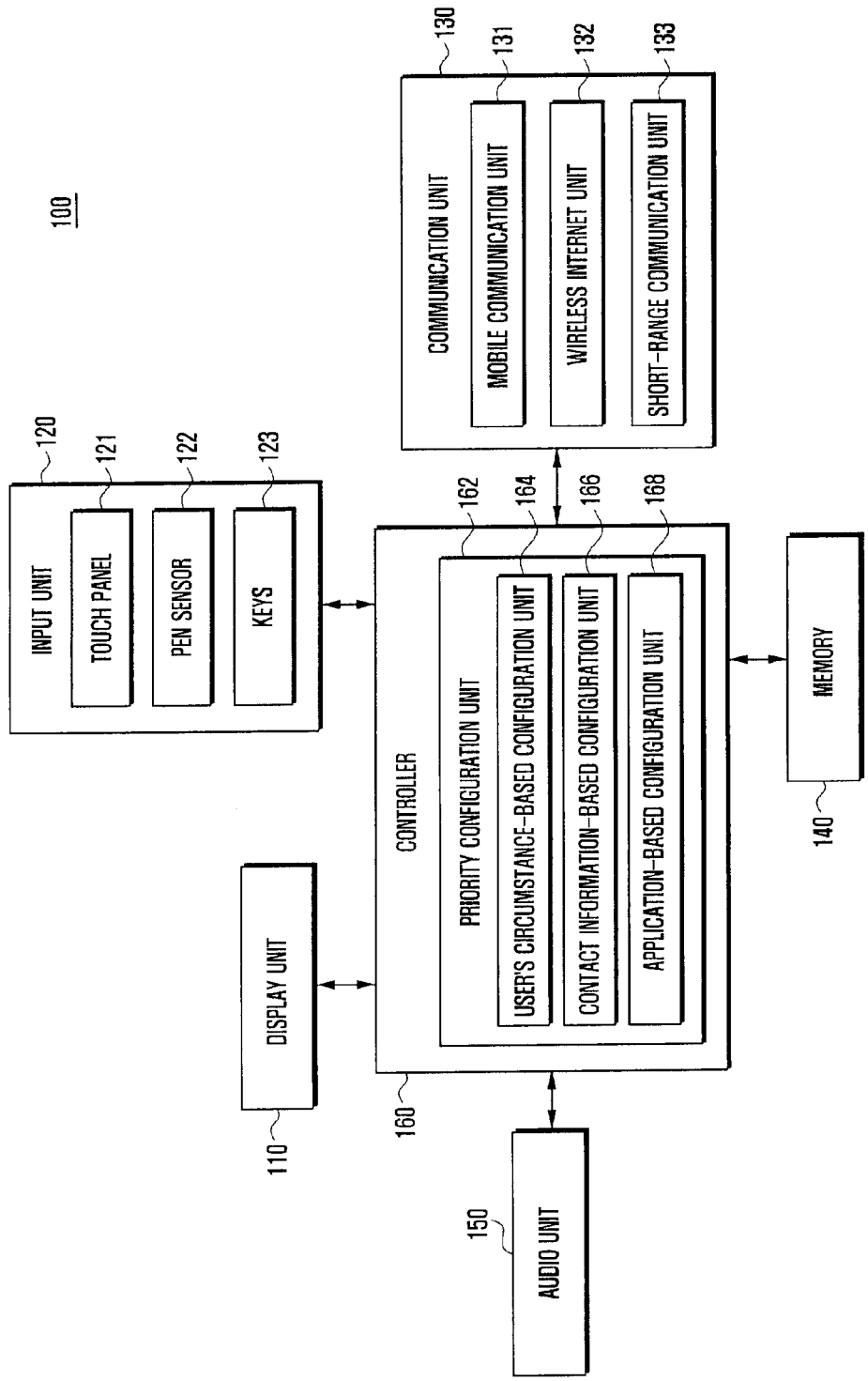
FIG. 1 is a block diagram of an electronic device, in accordance with an embodiment of the present specification.

Hereinafter, various embodiments will be described in detail with reference to the accompanying drawings. It should be noted that the same elements will be designated by the same reference numerals although they are shown in different drawings. Descriptions of the various operations discussed in the present disclosure are provided to facilitate understanding of the various embodiments of the present disclosure. Descriptions of well-known functions or operations will be omitted from the present disclosure in order to avoid making the subject matter of the present disclosure unclear.

The embodiments disclosed herein are merely examples and are not intended to limit the present disclosure. A person skilled in the art may make many variations and modifications to the embodiments discussed herein without departing from the disclosure. All such variations and modifications fall within the present disclosure.

FIG. 1 is a block diagram of an electronic device 100, in accordance with an embodiment of the present specification. The electronic device 100 may include a display unit 110, an input unit 120, a communication unit 130, a non-transitory memory 140, an audio unit 150, and a controller 160.

In one embodiment, the display unit 110 performs a function of displaying images or data to a user. The display unit 110 may include a display panel (not shown), which may be implemented by, for example, LCDs (Liquid-Crystal Displays), or AM-OLEDs (Active-Matrix Organic Light-Emitting Diodes). In one embodiment, the display unit 110 may further include a controller for controlling the display panel. The display panel, for example, may be implemented in a flexible type, a transparent type, or a wearable type.

In one embodiment, the display unit 110 is combined with a touch panel 121 to be provided in the form of a touch screen. For example, the touch screen may include an integrated module made by combining a display panel (not shown) and the touch panel 121 in a laminated structure.

In one embodiment, the input unit 120 receives various instructions from the user. For example, the input unit 120 may include at least one of the touch panel 121, a pen sensor 122, or keys 123.

In one embodiment, the touch panel 121 detects a touch input by the user in at least one of, for example, a capacitive type, a pressure-sensitive type, an infrared type, or an ultrasonic type. The touch panel 121 may further include a control circuit (not shown). In an embodiment incorporating the capacitive type, the touch panel 121 may detect proximity as well as the touch input. The touch panel 121 may further include a tactile layer that provides the user with a tactile reaction.

The pen sensor 122, for example, may be implemented using a separate pen recognition sheet in the same way as the user's touch input.

The keys 123 may include at least one of mechanical keys or touch keys. In one embodiment, the mechanical keys may include at least one of a power button that is provided in one side of the electronic device 100 to turn on the display of the electronic device 100 when it is pushed, one or more volume buttons that are provided on the other side of the electronic device 100 to control the volume when it is pushed, or a home button that is provided in the center of the bottom of the display unit 110 in the electronic device 100 to move on to a home screen image when it is pushed. In another embodiment, the touch keys may include a menu key that is provided in one side of the bottom of the display unit 110 of the electronic device 100 to provide a menu related to currently displayed content when it is touched, or a return key that is provided in the other side of the bottom of the display unit 110 of the electronic device 100 to provide a function of returning to the previous image of a currently displayed image when it is touched.

In one embodiment, the communication unit 130, under the control of the controller 160, forms a communication channel with an available network (e.g., a mobile communication network) in a configured method in order to thereby transmit and receive signals associated with wireless communication, such as voice communication, video communication, and data communication based on message services, such as short message service (SMS), multimedia message service (MMS), or Internet-based communication services.

In one embodiment, the electronic device 100 is configured to receive shape information from an external server through the communication unit 130 under the control of the controller 160. In addition, the communication unit 130 transmits information regarding the predetermined priority scheme, which is stored in the memory 140 of the electronic device 100, to an external server. In such circumstances, configuring the priority scheme every time the user makes changes to the electronic device is not necessary, and the information on the predetermined priority stored in the external server may be retrieved to thereby conveniently transmit data according to the priority scheme of the electronic device 100.

In one embodiment, the communication unit 130 includes at least one of a mobile communication unit 131, a wireless Internet unit 132, and a short-range communication unit 133. The mobile communication unit 131 may transmit/receive wireless signals to/from at least one of a base station, an external terminal, or a server in the mobile communication network. The wireless signals may include a voice call signal, a video call signal, or various pieces of data according to the text/multimedia message transmission/reception.

The wireless Internet unit 132 performs a function of a wireless Internet connection. The wireless Internet technology may include a WLAN (Wireless LAN) (Wi-Fi), Wibro (Wireless broadband), Wimax (World Interoperability for Microwave Access), HSDPA (High Speed Downlink Packet Access), or the like.

The short-range communication unit 133 performs a function of short-range communication. The short-range communication technology may include Bluetooth, RFID (Radio Frequency Identification), infrared data association (IrDA), UWB (Ultra Wideband), ZigBee, or the like.

In particular, Bluetooth technology may provide a method by which communication devices make wireless communication without using cables in a local area. The Bluetooth technology may use the ISM (Industrial Scientific Medical) radio band of 2.4 GHz that does not utilize a license. The Bluetooth system may provide a one-to-one connection or a one-to-multiple connection between Bluetooth devices adopting a Bluetooth function.

The non-transitory memory 140 may include at least one of an internal memory or an external memory. For example, the internal memory may include at least one of: a volatile memory {e.g., a dynamic RAM (DRAM), a static RAM (SRAM), a synchronous dynamic RAM (SDRAM), or the like}; a non-volatile Memory {e.g., an one time programmable ROM (OTPROM), a programmable ROM (PROM), an erasable and programmable ROM (EPROM), an electrically erasable and programmable ROM (EEPROM), a mask ROM, a flash ROM, or the like}; a hard disk drive (HDD); or a solid state drive (SDD). In an embodiment, the controller 160 may load instructions or data received from at least one of the non-volatile memory or other elements, in the volatile memory to process the same. In addition, the controller 160 may store data received from or generated by other elements in the non-volatile memory.

For example, the external memory may include at least one of a CF (Compact Flash), SD (Secure Digital), Micro-SD (Micro Secure Digital), Mini-SD (Mini Secure Digital), xD (extreme Digital), or a Memory Stick.

The memory 140 may store an operating system for controlling resources of the electronic device 100 and application programs for the operation of the applications. The operating system may include a kernel, a middleware, or an API. For example, the operating system may use Android, iOS, Windows, Symbian, Tizen, Bada, or the like.

The memory 140 may store information on the priority scheme for data transmission between the electronic device 100 and multi-paired Bluetooth devices. The information on the priority scheme may be created through a priority configuration unit 162. Therefore, the electronic device 100 may transmit data to different Bluetooth devices in sequence, based on the priority scheme stored in the memory 140.

In one embodiment, the audio unit 150 converts a sound into an electric signal, and vice versa. For example, the audio unit (or module) 150 may include at least one of a speaker, a receiver, earphones, or a microphone to process voice information input or output through the same.

In one embodiment, the controller 160 controls the overall operation of the electronic device 100, and may convert or control the operation of the electronic device 100 according to a user input received through the display unit 110 or the input unit 120.

The controller 160 may include the priority configuration unit 162. The priority configuration unit 162 may configure the priority scheme for transmitting data between the electronic device 100 and devices that are multi-paired using the short-range communication unit. In general, when an event occurs in the electronic device, the data regarding the event may be transmitted to all of the devices which are multi-paired with the electronic device.

In one embodiment, the electronic device 100 may configure the priority for the Bluetooth devices to which the data is to be transmitted upon the occurrence of the event, using the priority configuration unit 162. In other words, the electronic device may lower the priority of the electronic device to which the user does not wish to transmit data or may exclude the corresponding electronic device from the priority using the priority configuration unit 162, so the user's privacy can be protected and the user's convenience may be enhanced.

The priority configuration unit 162 may include at least one of a user's circumstance-based configuration unit 164, a contact information-based configuration unit 166, and an application-based configuration unit 168.

The user's circumstance-based configuration unit 164 may configure the priority scheme for data transmission according to the circumstances set by the user. For example, the user's circumstance-based configuration unit 164 may configure the priority scheme for data transmission according to the circumstances, such as a conference, driving, exercising, dating, sleeping, or the like.

In one embodiment, when an event occurs in the electronic device 100 in a dating mode, the user's circumstance-based configuration unit 164 may configure the first electronic device (e.g., a wearable device) as the first priority, and may configure the second electronic device (e.g., a Bluetooth earphones) as the second priority. At this time, the user's circumstance-based configuration unit 164 may not configure the third and subsequent priorities. Even though the electronic device 100 is paired with a car audio device, since the car audio device is not configured as the priority device in the dating mode, the data related to the event may not be output through the car audio device. That is, the user's privacy of the electronic device 100 may be protected in the dating mode through the configuration of the priority.

The contact information-based configuration unit 166 may configure the priority for data transmission for each item or each group, which is stored in the contact list.

In one embodiment, when the event occurs in the electronic device 100 in the case of a group of friends, the contact information-based configuration unit 166 may configure the first electronic device (e.g., the wearable device) as the first priority. In addition, when the event occurs in the electronic device 100 in the case of a company group, the contact information-based configuration unit 166 may configure the second electronic device (e.g., the Bluetooth earphones) as the first priority. Therefore, the user of the electronic device 100 may intuitively identify that the event has occurred in the contact information of the friend group by the notification generated in the first electronic device (e.g., the wearable device), and may intuitively identify that the event has occurred in the contact information of the company group by the notification generated in the second electronic device (e.g., the Bluetooth earphones).

In one embodiment, the contact information-based configuration unit 166 may configure the priority scheme such that the data is to be transmitted to a specific electronic device, in the case of specific contact information, upon the occurrence of the event. Thus, when the event occurs from a specific contact information, even though the electronic device 100 is multi-paired with a plurality of electronic devices, the contact information-based configuration unit 166 may configure such that the event is to be received using a preset electronic device.

The application-based configuration unit 168 may configure the priority for data transmission for each application that is executable in the electronic device 100. For example, the application-based configuration unit 168 may configure the priority for data transmission for each application, such as a call application, a navigation application, or a music player.

In one embodiment, when the event occurs in the electronic device 100 in the case of the music player, the application-based configuration unit 168 may configure the first electronic device (e.g., the car audio device) as the first priority. In addition, in the case of the navigation, the application-based configuration unit 168 may configure the second electronic device (e.g., the Bluetooth earphones) as the first priority. Therefore, since the user may reproduce the music using the first electronic device, and may reproduce the voice guidance of the navigation using the second electronic device while driving so that the reproduced music and voice guidance may be correctly provided to the user without interference with each other.

In addition, the priority configuration unit 162 may renew the preset priority. In other words, a certain device may be in the unpaired state when the event occurs, even though it had been paired with the electronic device at the time of priority configuration. For example, when the event occurs in the electronic device 100, at least one of devices, which have been configured as the priority, may be turned off, or may be out of the Bluetooth transmission/reception range. In this case, if the preset priority scheme is reconfigured with respect to the devices that are currently available for receiving data, the data related to the event may be more effectively transmitted.

In various embodiments of the disclosure, even though a device does not belong to the preset priority scheme, if the device can receive the data while it is paired with the electronic device when the event occurs, the priority configuration unit 162 may reconfigure the priority scheme by adding the corresponding device thereto. That is, the priority configuration unit 162 may renew the priority scheme according to the devices that are currently available for receiving data when the event occurs.

An electronic device, according to various embodiments, may include: a short-range communication unit; and a controller that configures priority of two or more other electronic devices that are paired with the electronic device, and, when an event occurs, control the electronic device to transmit data regarding the event to at least one of the other electronic devices based on the priority scheme using the short-range communication unit.

The controller may configure the priority scheme of other electronic devices for each priority configuration, and each priority configuration may include at least one of the user's circumstances, contact information, or applications.

The user's circumstances may include at least one of a study mode, a driving mode, a dating mode, an exercising mode, a sleeping mode, or a conference mode.

The event may include at least one of receiving a call, receiving a message, or executing an application.

The electronic device may include an input unit and a display unit, and the controller may control the electronic device to receive an input for selecting the priority configuration through the input unit; receive an input for selecting a certain item listed to correspond to the priority configuration through the input unit; receive an input for selecting the priority listed to correspond to the certain item through the input unit; display a list of other electronic devices in the display unit; receive an input for selecting one of the other electronic devices through the input unit; and configure the selected electronic device as the selected priority.

The controller may control the electronic device to: discover other electronic devices near the electronic device using the short-range communication unit; pair with the discovered other electronic devices using the short-range communication unit; and display the paired other electronic devices in the list on the display unit.

The controller may determine whether or not the priority is configured to correspond to the event; and may control the electronic device to transmit the data regarding the event to an electronic device of a first priority from the priority scheme using the short-range communication unit.

The controller may control the electronic device to: identify whether the electronic device of the first priority receives the event or refuses to receive the same within a predetermined amount of time using the short-range communication unit; and if the electronic device of the first priority does not receive the event or does not refuse to receive the same within a predetermined amount of time, transmit the data regarding the event to an electronic device of the second priority among the priority using the short-range communication unit.

The controller, when the event occurs, may control the electronic device to identify whether or not other electronic devices included in the priority are paired using the short-range communication unit, and may exclude the electronic devices that are not paired among other electronic devices from the priority to thereby reconfigure the preset priority.

Figure 2:
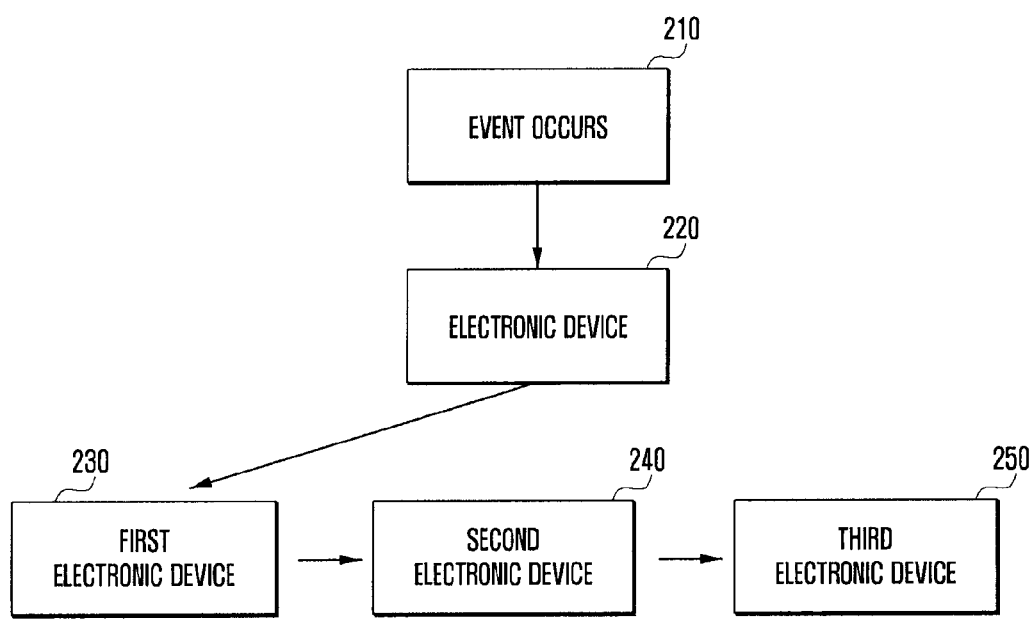
FIG. 2 illustrates a procedure to transmit data to a multi-paired electronic device according to the priority when an event of an electronic device occurs, in accordance with an embodiment of the present specification.

FIG. 2 illustrates a procedure to transmit data to other multi-paired electronic devices according to the preset priority when an event of an electronic device occurs, according to one of various embodiments disclosed in the present specification.

The electronic device 220 or 100 may receive an event 210 created from other electronic devices, or may create a new event 210. For example, the electronic device 220 may receive an event, such as a call or a message, and may create an event, such as reproducing music or executing the navigation application.

In an embodiment, when a call event is received, the electronic device 220 or 100 may transmit data on a call connection to the first electronic device 230 (e.g., the wearable device) as the first priority according to the preset priority scheme. If a reception event or a rejection event in response to the call connection does not occur within a predetermined amount of time in the first electronic device 230, the electronic device 220 may transmit the data on the call connection to the second electronic device 240 (e.g., the Bluetooth headset) as the second priority. Meanwhile, if a reception event or a rejection event in response to the call connection does not occur within a predetermined amount of time in the second electronic device 240, the electronic device 220 may transmit the data on the call connection to the third electronic device 250 (e.g., a car speaker) as the third priority. That is, when the electronic device 220 receives the call event, the electronic device 220 may simultaneously transmit the data on the call connection to the first electronic device 230, the second electronic device 240, and third electronic device 250, or may transmit the data on the call connection to the same in sequence based on the preset priority scheme.

In another embodiment, during the transmission of the data regarding the event according to the priority as the embodiment above, the electronic device 220 or 100 may receive a switching input from the electronic device of the corresponding priority to thereby switch to a broadcasting mode. That is, if the user of the electronic device 220 wishes to transmit the data regarding the event to all of the devices that are multi-paired with the electronic device 220, the user may press a switching button in the middle of transmitting the data regarding the event on the basis of the priority. According to this, the electronic device 220 or 100 may protect the user's privacy and may improve the sharing of data with others.

Figure 3:
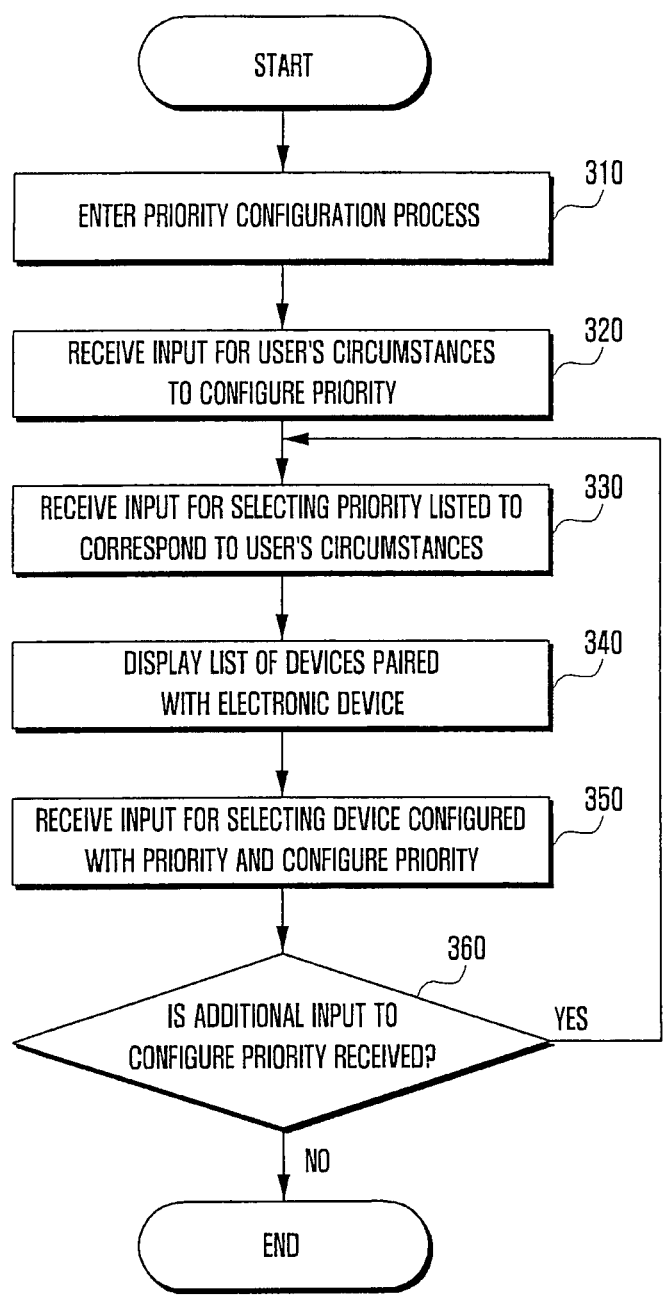
FIG. 3 is a flowchart illustrating a method for configuring the priority of electronic devices to which data is to be transmitted, based on the user's circumstances of an electronic device, in accordance with an embodiment of the present specification.

FIG. 3 is a flowchart of a method for configuring the priority of electronic devices to which data is to be transmitted, based on user's circumstances of an electronic device, according to one of various embodiments disclosed in the present specification.

In operation 310, the electronic device 100 may enter the process for configuring the priority for the devices to which the data regarding the event is to be transmitted upon the occurrence of the event.

In operation 320, the electronic device 100 may receive an input regarding the user's circumstances to configure the priority from the user. For example, the user of the electronic device 100 may create a mode according to the circumstances, such as a conference, driving, exercising, dating, or studying, and may select a specific mode according thereto. Therefore, the electronic device 100 may configure the priority scheme to correspond to the user's circumstances.

In operation 330, the electronic device 100 may receive, from the user, an input for selecting at least one priority item from a priority list displayed to correspond to the user's circumstances selected in operation 320. For example, if the user selects an exercising mode, the electronic device may display the first priority, the second priority, and the third priority, which correspond to the exercising mode. The user of the electronic device 100 may select one priority item from the displayed priority list in order to thereby configure a device corresponding to the priority scheme.

In operation 340, the electronic device 100 may display a list regarding one or more devices that are paired with the electronic device 100. Meanwhile, if the device that the user wishes to configure with the priority is not displayed in the list, the electronic device 100 may discover an additional device, and if a new device is discovered, the electronic device 100 may pair with the device and may update the corresponding device in the device list.

In operation 350, the electronic device 100 may receive an input for selecting one device from the list displayed in operation 340 from the user, and may configure such that the selected device corresponds to the priority selected in operation 330.

In operation 360, the electronic device 100 may determine whether or not an additional input for configuring the priority is received from the user.

If the electronic device 100 receives the input for additionally configuring the priority from the user, the electronic device 100 may return to operation 330 to then receive an input for selecting at least one priority item from the priority list displayed to correspond to the user's circumstances selected in operation 320 from the user.

Figure 4:
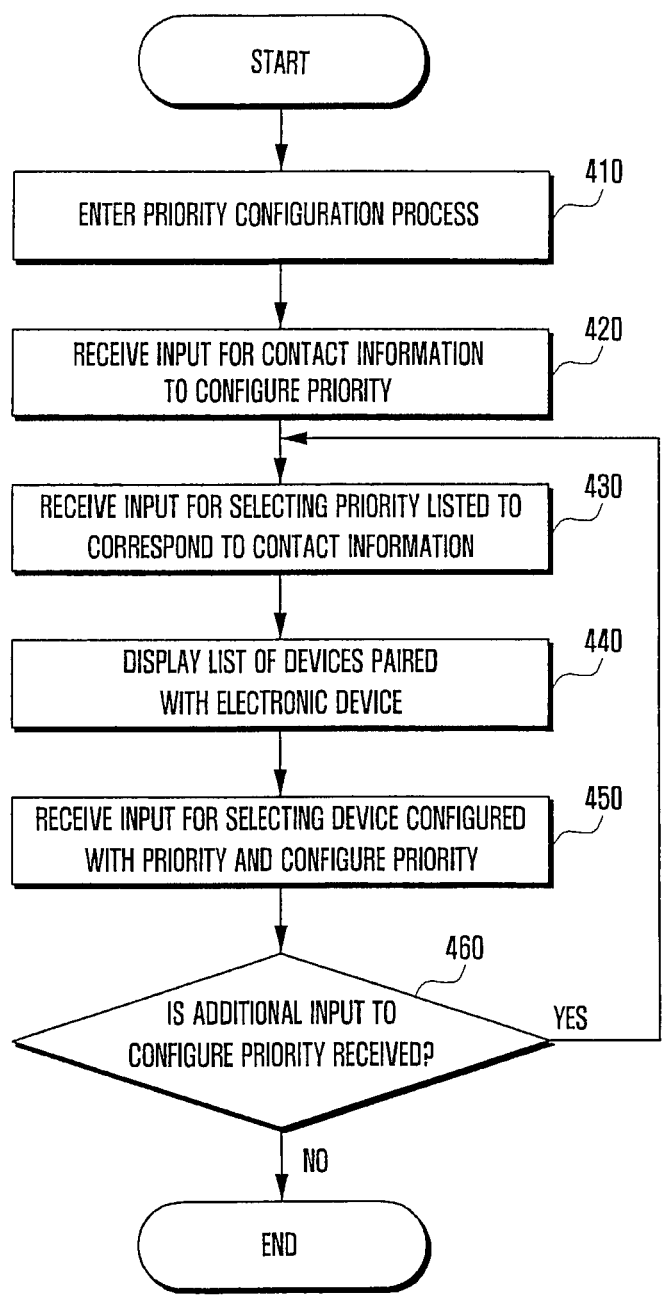
FIG. 4 is a flowchart illustrating a method for configuring the priority of electronic devices to which data is to be transmitted, based on contact information of an electronic device, in accordance with an embodiment of the present specification.

FIG. 4 is a flowchart of a method for configuring the priority of electronic devices to which data is to be transmitted, based on contact information of an electronic device, according to one of various embodiments disclosed in the present specification.

In operation 410, the electronic device 100 may enter the process for configuring the priority for the devices to which the data regarding the event is to be transmitted upon the occurrence of the event.

In operation 420, the electronic device 100 may receive an input regarding contact information to configure the priority from the user. For example, the user of the electronic device 100 may select a certain item (e.g., individual contact information or a group) stored in the contact information. According to this, the electronic device 100 may configure the priority to correspond to the contact information selected by the user.

In operation 430, the electronic device 100 may receive, from the user, an input for selecting at least one priority item from the priority list displayed to correspond to the contact information selected in operation 420. For example, if the user selects Hong Gil Dong, the electronic device may display the first priority, the second priority, and the third priority, which correspond to Hong Gil Dong. The user of the electronic device 100 may select one priority item from the displayed priority list in order to thereby configure a device corresponding to the priority scheme.

In operation 440, the electronic device 100 may display a list regarding one or more devices that are paired with the electronic device 100. Meanwhile, if the device that the user wishes to configure with the priority scheme is not displayed in the list, the electronic device 100 may discover an additional device, and if a new device is discovered, the electronic device 100 may pair with the device and may update the corresponding device in the device list.

In operation 450, the electronic device 100 may receive an input for selecting one device from the list displayed in operation 440 from the user, and may configure such that the selected device corresponds to the priority selected in operation 430.

In operation 460, the electronic device 100 may determine whether or not an additional input for configuring the priority scheme is received from the user.

If the electronic device 100 receives the input for additionally configuring the priority from the user, the electronic device 100 may return to operation 430 to then receive, from the user, an input for selecting at least one priority item from the priority list displayed to correspond to the contact information selected in operation 420.

Figure 5:
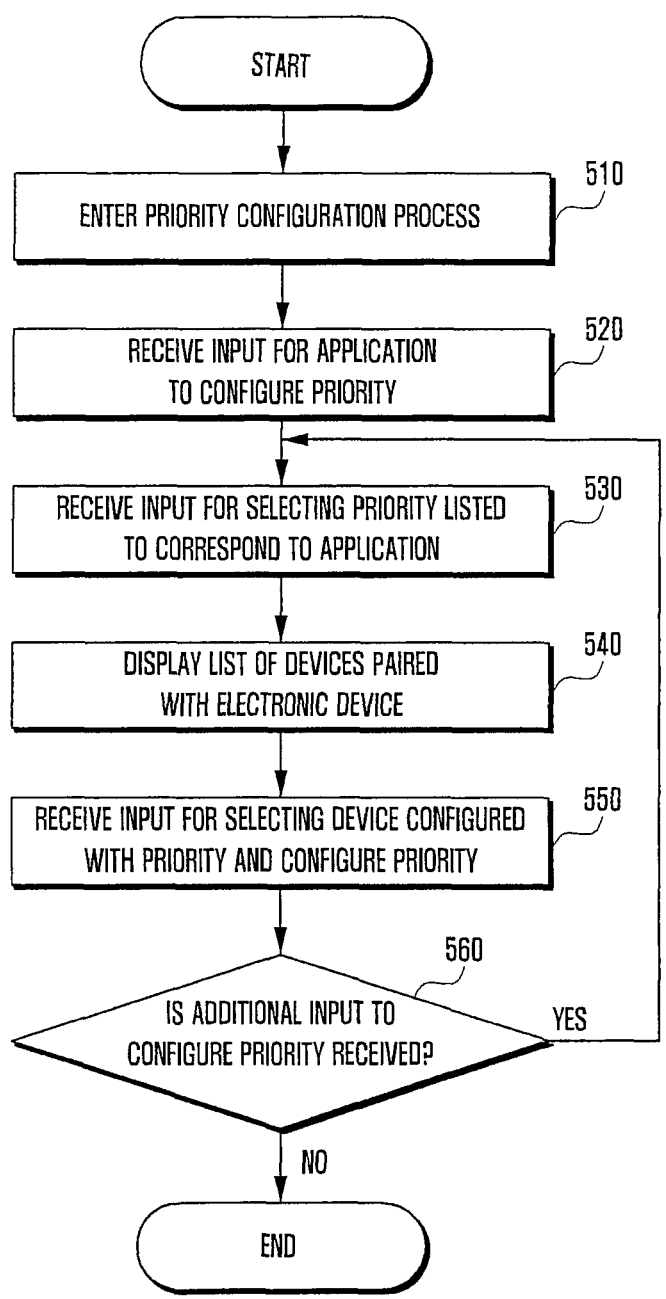
FIG. 5 is a flowchart illustrating a method for configuring the priority of electronic devices to which data is to be transmitted, based on applications of an electronic device, in accordance with an embodiment of the present specification.

FIG. 5 is a flowchart of a method for configuring the priority of electronic devices to which data is to be transmitted, based on applications of an electronic device, according to one of various embodiments disclosed in the present specification.

In operation 510, the electronic device 100 may enter the process for configuring the priority for the devices to which the data regarding the event is to be transmitted upon the occurrence of the event.

In operation 520, the electronic device 100 may receive an input regarding an application to configure the priority from the user. For example, in order to configure the priority for applications, such as a music player, DMB (Digital Multimedia Broadcasting), a navigation application, or a phone call application, the user of the electronic device 100 may select the corresponding application. According to this, the electronic device 100 may configure the priority to correspond to the application selected by the user.

In operation 530, the electronic device 100 may receive, from the user, an input for selecting at least one priority item of the priority list displayed to correspond to the application selected in operation 520. For example, if the user selects the navigation application, the electronic device may display the first priority, the second priority, and the third priority, which correspond to the navigation application. The user of the electronic device 100 may select one priority item from the displayed priority list in order to thereby configure a Bluetooth device corresponding to the priority scheme.

In operation 540, the electronic device 100 may display a list regarding one or more devices that are paired with the electronic device 100. If the device that the user wishes to configure with the priority is not displayed in the list, the electronic device 100 may discover an additional device, and if a new device is discovered, the electronic device 100 may pair with the device and may update the corresponding device in the device list.

In operation 550, the electronic device 100 may receive an input for selecting one device from the list displayed in operation 540 from the user, and may configure such that the selected device corresponds to the priority scheme selected in operation 530.

In operation 560, the electronic device 100 may determine whether or not an additional input for configuring the priority scheme is received from the user.

If the electronic device 100 receives the input for additionally configuring the priority from the user, the electronic device 100 may return to operation 530 to then receive, from the user, an input for selecting at least one priority item from the priority list displayed to correspond to the application selected in operation 520.

Figure 6A:
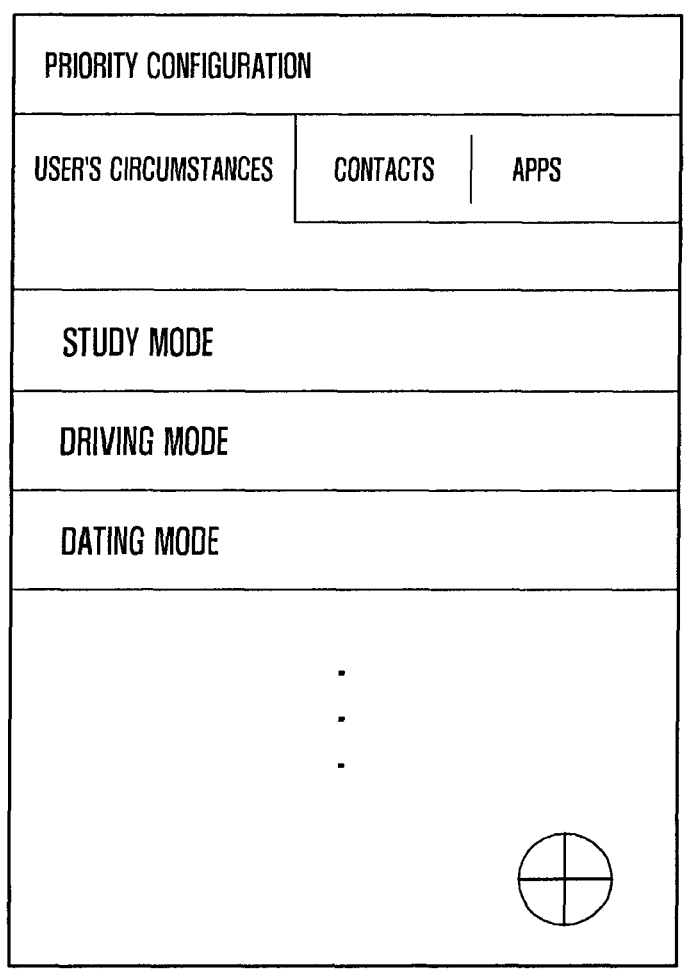
FIG. 6A and FIG. 6B are diagrams of a user interface (UI) to configure the priority for data transmission in an electronic device, in accordance with an embodiment of the present specification.
Figure 6B:
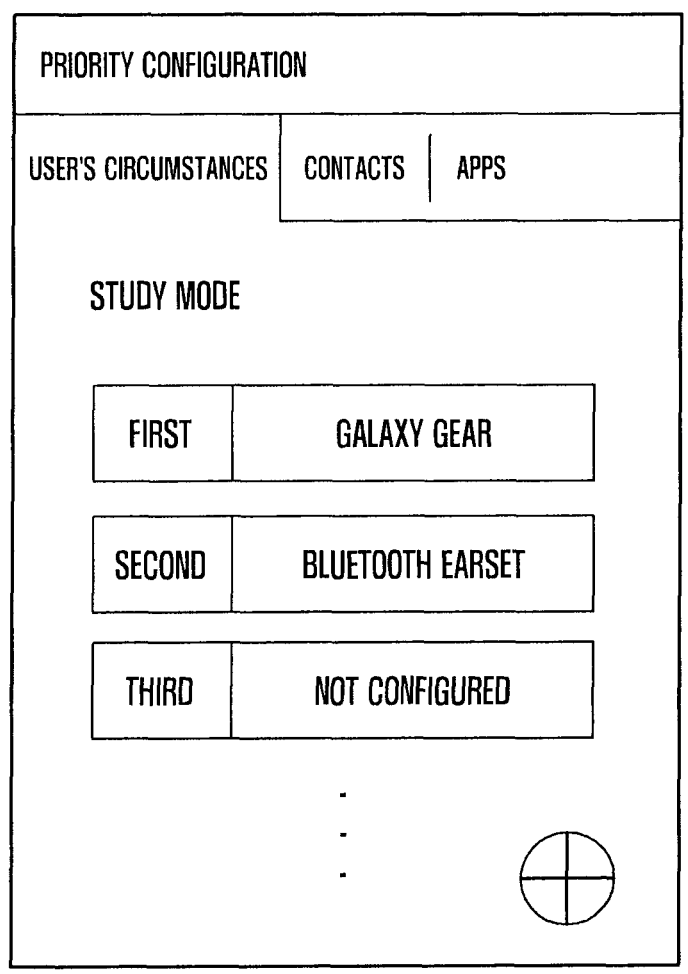

FIGS. 6A and 6B are diagrams of a user interface (UI) to configure the priority for data transmission in an electronic device, according to one of various embodiments disclosed in the present specification.

Referring to FIG. 6A, the user interface for configuring the priority for data transmission of the electronic device may separate priority configuration items to be displayed. For example, the electronic device 100 may separate the priority configuration items into user's circumstances, contact information, or Apps (applications), and may display the same through the user interface.

In an embodiment, the electronic device 100 may receive an input to select the user's circumstances from the priority configuration items from the user. The electronic device 100 may display a study mode, a driving mode, a conference mode, an exercising mode, or a dating mode to correspond to the items of user's circumstances. Meanwhile, if the user of the electronic device 100 wishes to add a desired circumstance mode, the user may select "+" of FIG. 6A to thereby create a new mode, and the electronic device 100 may display the newly created mode in the items of user's circumstances.

Referring to FIG. 6B, if the user selects the study mode of FIG. 6A, the electronic device 100 may display one or more priority items corresponding to the study mode, and the devices corresponding to the priority items.

In an embodiment, the electronic device 100 may display a screen image showing that: a Galaxy Gear is configured as the first priority; a Bluetooth earphones is configured as the second priority; and no device is configured as the third priority. Meanwhile, if the user of the electronic device 100 wishes to add a new priority item, the user may select "+" of FIG. 6B to thereby create a new priority item, and the electronic device 100 may display the newly created priority item in the study mode.

The user interface set forth above is merely an example to help understand the present disclosure, and it is not intended to limit the present disclosure.

Figure 7:
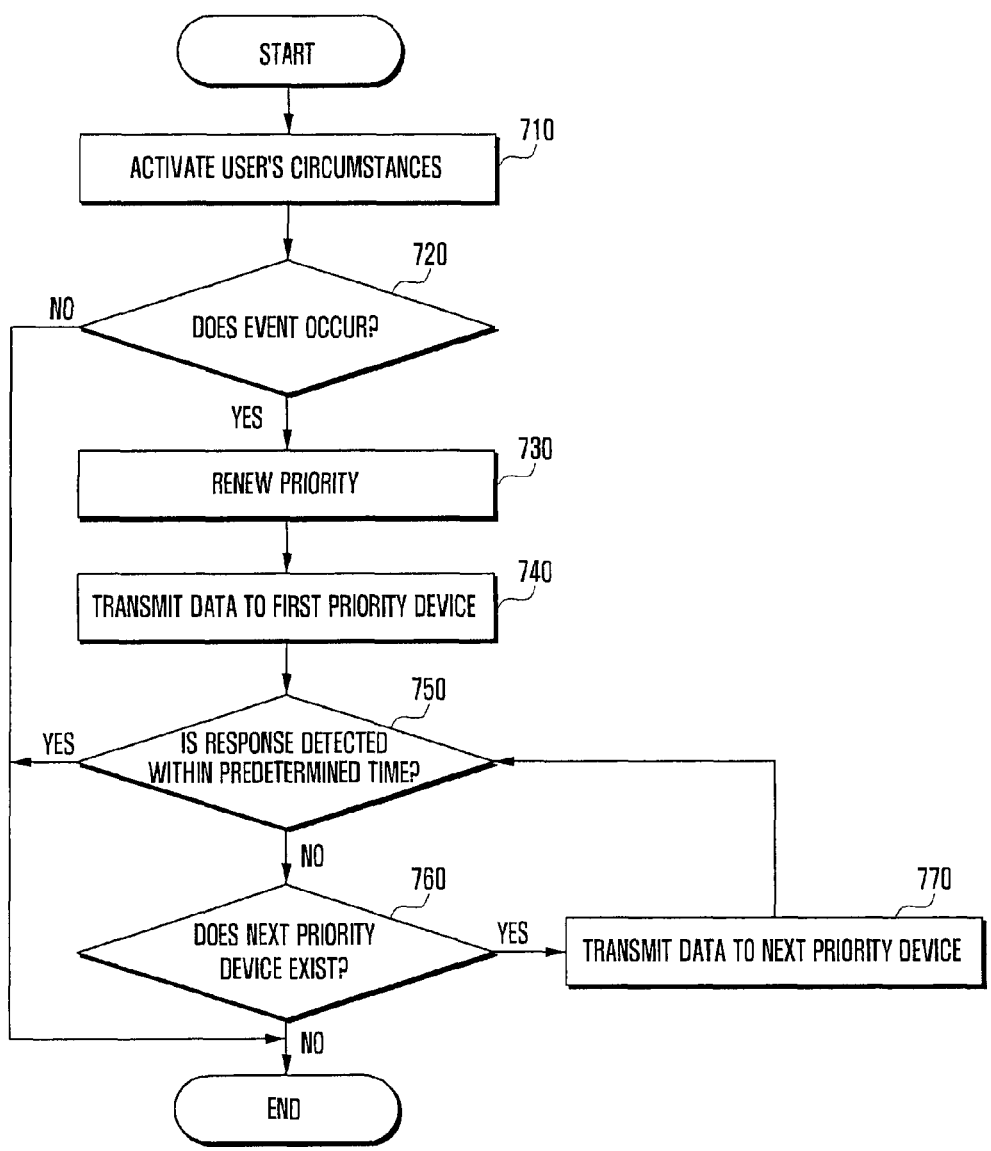
FIG. 7 is a flowchart illustrating a method for transmitting data on the basis of the priority corresponding to user's circumstances of an electronic device, in accordance with an embodiment of the present specification.

FIG. 7 is a flowchart of a method for transmitting data on the basis of the priority scheme corresponding to user's circumstances of an electronic device, according to one of various embodiments disclosed in the present specification.

In operation 710, the electronic device 100 may activate one of the predetermined user's circumstances. For example, the electronic device 100 may activate one of a conference mode, a driving mode, an exercising mode, a dating mode, a study mode, or a sleeping mode in response to a user input.

In operation 720, the electronic device 100 may determine whether or not an event occurs. For example, the event may include receiving a call, receiving a message, or executing an application included in the electronic device 100.

If an event occurs, the electronic device may proceed to operation 730 to thereby renew the priority of the devices, which has been configured to correspond to the user's circumstances executed in operation 710. For example, when the event occurs in the electronic device 100, at least one of the devices that have been configured with the priority scheme may be in the power-off state, or may be out of the Bluetooth transmission range. In this case, the electronic device 100 may renew the typical priority according to the devices available for currently receiving data.

In an embodiment, the first electronic device (e.g., the Bluetooth earphones) may be configured as the first priority of the driving mode, and the second electronic device (e.g., the car audio device) may be configured as the second priority. The third electronic device (e.g., the wearable device) may be configured as the third priority. Meanwhile, if the event occurs while the first electronic device is turned off, the electronic device 100 may configure the second electronic device (e.g., the car audio device) and the third electronic device (e.g., the wearable device) as the first priority and the second priority, respectively, with respect to the generated event, to thereby renew the priority scheme. Therefore, the electronic device 100 may not determine whether or not the first electronic device (the Bluetooth earphones) as the previous first priority responds within a predetermined amount of time as operation 750, and may transmit the data regarding the event to the second electronic device (e.g., the car audio device) as the second priority.

In operation 740, the electronic device 100 may transmit the data regarding the event that has occurred in operation 720 to the first priority device renewed in operation 730. For example, in the embodiment above, the electronic device 100 may transmit the data regarding the event to the second electronic device (e.g., the car audio device) that has been newly configured as the first priority.

In operation 750, the electronic device 100 may identify whether or not a reception event or a rejection event occurs in the first priority device within a predetermined amount of time. In the case where the first priority device receives the event, transmitting the event to the next priority device is not necessary. In the case where the first priority device refuses to receive the event, the data regarding the event may not be transmitted to the next priority device because the user can hardly receive the event. The response waiting time may be configured by the manufacturer or the user.

If the reception event or the rejection event does not occur within a predetermined amount of time in the first priority device, the electronic device 100 may proceed to operation 760 to thereby identify whether or not the next priority device exists. If the reception event or the rejection event does not occur within a predetermined amount of time in the first priority device, it may mean that the user does not recognize the occurrence of the event. Alternatively, it may mean that the user wishes to receive the corresponding event using another device. Accordingly, if there is no response from the first priority device, the electronic device 100 may identify whether or not the next priority device exists.

If the next priority device exists, the electronic device 100 may proceed to operation 770 to thereby transmit the data regarding the event created in operation 720 to the next priority device. For example, if the second priority device exists, the electronic device 100 may perform a routine by which the electronic device 100 transmits the event to the second priority device and determines whether or not a reception event or a rejection event occurs in the second priority device.

Meanwhile, in another embodiment, the electronic device 100 may receive a switching signal from other electronic devices as well as the response of the reception or rejection. While the electronic device 100 transmits the data regarding the event according to the priority as the embodiment above, the electronic device 100 may receive a switching input from the electronic device of the corresponding priority to thereby switch to a broadcasting mode. That is, if the user of the electronic device 220 wishes to transmit the data regarding the event to all of the devices that are multi-paired with the electronic device 100, the user may press a switching button in the middle of transmitting the data regarding the event on the basis of the priority scheme. According to this, the electronic device 100 may protect the user's privacy and may improve the sharing with others.

Figure 8:
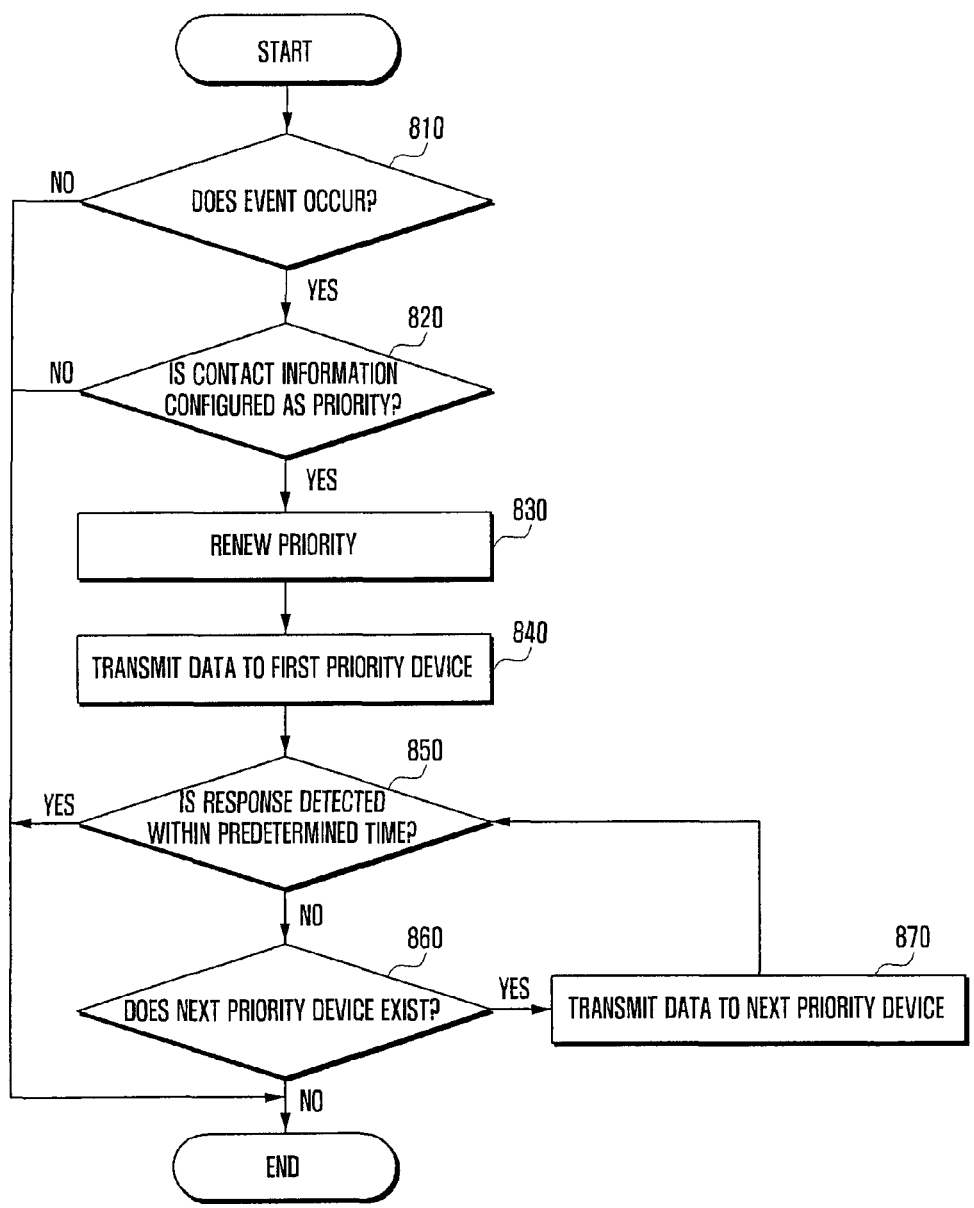
FIG. 8 is a flowchart illustrating a method for transmitting data on the basis of the priority corresponding to contact information of an electronic device, in accordance with an embodiment of the present specification.

FIG. 8 is a flowchart of a method for transmitting data on the basis of the priority corresponding to contact information of an electronic device, according to one of various embodiments disclosed in the present specification.

In operation 810, the electronic device 100 may determine whether or not an event occurs. For example, the event may include receiving a call, receiving a message, or executing an application included in the electronic device 100.

If an event occurs, the electronic device may proceed to operation 820 to thereby determine whether or not the priority corresponding to the contact information related to the generated event has been configured. For example, when a call is received from Hong Gil Dong, the electronic device may determine whether or not the priority preconfigured to correspond to Hong Gil Dong exists.

If it is determined that the priority scheme corresponding to the contact information related to the event has been configured, the electronic device may proceed to operation 830 to thereby renew the priority of the devices, which has been configured to correspond to the contact information. For example, when the event occurs in the electronic device 100, at least one of the devices which have been configured with the priority scheme may be in the power-off state, or may be out of the Bluetooth transmission range. In this case, the electronic device 100 may renew the typical priority according to the devices that are available to currently receive data.

In an embodiment, the first electronic device (e.g., the wearable device) may be configured as the first priority with respect to Hong Gil Dong, and the second electronic device (e.g., the Bluetooth headset) may be configured as the second priority. Meanwhile, if the event occurs while the first electronic device (e.g., the wearable device) is turned off, the electronic device 100 may configure the second electronic device (e.g., the Bluetooth headset) as the first priority with respect to the generated event. Therefore, the electronic device 100 may not determine whether or not the first electronic device (e.g., the wearable device) as the previous first priority responds within a predetermined amount of time as operation 850, and may transmit the data regarding the event to the second electronic device (e.g., the Bluetooth headset) as the second priority.

In operation 840, the electronic device 100 may transmit the data regarding the event that has occurred in operation 810 to the first priority device renewed in operation 830. For example, in the embodiment above, the electronic device 100 may transmit the data regarding the event to the second electronic device (e.g., the Bluetooth headset) that has been newly configured as the first priority.

In operation 850, the electronic device 100 may identify whether or not a reception event or a rejection event occurs in the first priority device within a predetermined amount of time. In the case where the first priority device receives the event, transmitting the event to the next priority device is not necessary. In the case where the first priority device refuses to receive the event, the data regarding the event may not be transmitted to the next priority device because the user can hardly receive the event. Meanwhile, the response waiting time may be configured by the manufacturer or the user.

If the reception event or the rejection event does not occur within a predetermined amount of time in the first priority device, the electronic device 100 may proceed to operation 860 to thereby identify whether or not the next priority device exists. If the reception event or the rejection event does not occur within a predetermined amount of time, it may mean that the user does not recognize the occurrence of the event. Alternatively, it may mean that the user wishes to receive the corresponding event using another device. Accordingly, if there is no response from the first priority device, the electronic device 100 may identify whether or not the next priority device exists.

If the next priority device exists, the electronic device 100 may proceed to operation 870 to thereby transmit the data regarding the event generated in operation 810 to the next priority device. For example, if the second priority device exists, the electronic device 100 may perform a routine by which the electronic device 100 transmits the event to the second priority device and determines whether or not a reception event or a rejection event occurs in the second priority device.

In another embodiment, the electronic device 100 may receive a switching signal from other electronic devices as well as the response of the reception or rejection. While the electronic device 100 transmits the data regarding the event according to the priority as the embodiment above, the electronic device 100 may receive a switching input from the electronic device of the corresponding priority to thereby switch to a broadcasting mode. That is, if the user of the electronic device 100 wishes to transmit the data regarding the event to all of the devices that are multi-paired with the electronic device 100, the user may press a switching button in the middle of transmitting the data regarding the event on the basis of the priority. According to this, the electronic device 100 may protect the user's privacy and may improve the sharing with others.

FIG. 9 is a flowchart of a method for transmitting data on the basis of the priority corresponding to applications of an electronic device, according to one of various embodiments disclosed in the present specification.

In operation 910, the electronic device 100 may execute at least one application. For example, the application may include a call application, a navigation application, or a music application. In one embodiment, the electronic device 100 may execute the navigation application and the music application.

In operation 920, the electronic device 100 may determine whether or not the first event occurs in the first application. In one embodiment, the electronic device 100 may determine whether or not the music is being reproduced through a music player.

If the first event occurs, the electronic device 100 may proceed to operation 930 to thereby determine whether or not the priority corresponding to the first application has been configured. In one embodiment, the electronic device 100 may determine whether or not the priority for the music player has been configured.

If it is determined that the priority corresponding to the first application has been configured, the electronic device 100 may proceed to operation 940 to thereby renew the priority of the devices, which has been configured to correspond to the first application. For example, when the event occurs in the electronic device 100, at least one of the devices that have been configured with the priority scheme may be in the power-off state, or may be out of the Bluetooth transmission range. In such circumstances, the electronic device 100 may renew the typical priority according to the devices available for currently receiving data.

In one embodiment, the first electronic device (e.g., the wearable device) may be configured as the first priority with respect to the music player, and the second electronic device (e.g., the car audio device) and the third electronic device (e.g., the Bluetooth headset) may be configured as the second priority and the third priority, respectively. Meanwhile, if the music is reproduced while the first electronic device (e.g., the wearable device) is turned off, the electronic device 100 may configure the second electronic device (e.g., the car audio device) and the third electronic device (e.g., the Bluetooth headset) as the first priority and the second priority, respectively.

In operation 950, the electronic device 100 may transmit the data on the first event that has occurred in operation 920 to the first priority device renewed in operation 940. In one embodiment, the electronic device 100 may transmit the data on the music to be reproduced to the second electronic device (e.g., the car audio device) that has been newly configured as the first priority.

In operation 960, the electronic device 100 may identify whether or not the second event occurs in the second application. In one embodiment, the electronic device 100 may determine whether or not the voice guidance is being output through the navigation.

If the second event occurs in the second application, the electronic device 100 may return to operation 930 to thereby determine whether or not the priority corresponding to the second application has been configured.

In one embodiment, the electronic device 100 may determine whether or not the priority for the navigation has been configured.

If it is determined that the priority corresponding to the second application has been configured, the electronic device 100 may proceed to operation 940 to thereby renew the priority of the devices, which has been configured to correspond to the second application. For example, when the event occurs in the electronic device 100, at least one of the devices which had been configured with the priority scheme may be in the power-off state, or may be out of the Bluetooth transmission range. In this case, the electronic device 100 may renew the typical priority according to the devices available for currently receiving data.

In one embodiment, the third electronic device (e.g., the Bluetooth headset) may be configured as the first priority with respect to the navigation, and the second electronic device (e.g., the car audio device) may be configured as the second priority. In the case where all of the electronic devices are paired with the electronic device 100, the third electronic device (e.g., the Bluetooth headset) may remain as the first priority.

In operation 950, the electronic device 100 may transmit the data on the second event that has occurred in operation 960 to the first priority device renewed in operation 940. In an embodiment, the electronic device 100 may transmit the data on the voice guidance of the navigation to the third electronic device (e.g., the Bluetooth headset) that has been newly configured as the first priority.

Accordingly, the electronic device 100 may control the electronic device to transmit the data on the music to the second electronic device (e.g., the car audio device) to be thereby output in the second electronic device (e.g., the car audio device), and to transmit the data on the voice guidance to the third electronic device (e.g., the Bluetooth headset) to be thereby output in the third electronic device (e.g., the Bluetooth headset). Meanwhile, the electronic device 100 may perform the routine above in response to an event generated from at least one application.

A method for transmitting data in an electronic device, according to various embodiments, may include: controlling a priority scheme of two or more other electronic devices which are paired with the electronic device; and when an event occurs, transmitting data regarding the event to at least one of the other electronic devices based on the priority scheme.

The configuring of the priority scheme of other electronic devices may include configuring the priority scheme for each priority configuration, and the priority configuration may include at least one of the user's circumstances, contact information, or applications.

The user's circumstances may include at least one of a study mode, a driving mode, a dating mode, an exercising mode, a sleeping mode, or a conference mode.

The event may include at least one of receiving a call, receiving a message, or executing an application.

The configuring of the priority of other electronic devices may include: receiving an input for selecting the priority configuration; receiving an input for selecting a certain item listed to correspond to the priority configuration; receiving an input for selecting the priority listed to correspond to the certain item; displaying a list of other electronic devices; receiving an input for selecting one of the other electronic devices; and configuring the selected electronic device as the selected priority.

The displaying of the list of other electronic devices may include: discovering other electronic devices near the electronic device; pairing with the discovered other electronic devices; and displaying the paired other electronic devices in the list.

The transmitting of the data regarding the event may include: determining whether or not the priority is configured to correspond to the event; and transmitting the data regarding the event to an electronic device of the first priority among the priority.

The method may further include: identifying whether the electronic device of the first priority receives the event or refuses to receive the same within a predetermined amount of time; and if the electronic device of the first priority does not receive the event or does not refuse to receive the same within a predetermined amount of time, transmitting the data regarding the event to an electronic device of the second priority among the priority.

The method may further include, when the event occurs, reconfiguring the preset priority scheme.

The reconfiguring of the priority may include: identifying whether or not other electronic devices included in the priority are paired; and excluding the electronic devices that are not paired among other electronic devices from the priority to thereby reconfigure the priority.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor or controller 160), the one or more processors may execute a function corresponding to the command. The computer-readable storage medium may be, for example, the storage unit (e.g., memory 140). At least some of the programming modules may be implemented (for example, executed) by, for example, the processor or controller 160. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner.

Further, some operations may be executed according to another order or may be omitted, or other operations may be added.

According to various embodiments, a computer-readable recording medium may store instructions to perform a data transmission method of an electronic device, and the data transmission method may include: configuring the priority of two or more other electronic devices that are paired with the electronic device; and when an event occurs, transmitting data regarding the event to at least one of the other electronic devices on the basis of the priority. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

The embodiments disclosed in the specification and drawings are merely presented to easily describe technical contents of various embodiments of the present disclosure and help the understanding of them and are not intended to limit the various embodiments of the present disclosure. Therefore, all changes or modifications derived from the technical idea of various embodiments of the present disclosure as well as various embodiments disclosed herein should be construed to fall within the various embodiments of the present disclosure.

What is claimed is:

1. An electronic device comprising:
    an input unit;
    a display unit;
    a short-range communication unit; and
    a controller configured to:
        cause the electronic device to simultaneously pair with two or more other electronic devices using the short-range communication unit,
        receive a first input for selecting a priority configuration through the input unit, wherein the priority configuration is based on at least one of a user's circumstances, contact information, or an application executing in the electronic device,
        receive a second input for selecting an item corresponding to the selected priority configuration through the input unit,
        display a list of the two or more other electronic devices in the display unit,
        receive a third input for selecting one of the two or more other electronic devices through the input unit,
        set a priority, based on the third input, prioritizing the two or more other electronic devices for transmission of data to the two or more other electronic devices, and
        transmit data regarding an event to at least one of the two or more other electronic devices based on the priority using the short-range communication unit.

2. The electronic device of claim 1, wherein the user's circumstances include at least one of a study mode, a driving mode, a dating mode, an exercising mode, a sleeping mode, or a conference mode.

3. The electronic device of claim 1, wherein the event includes at least one of receiving a call, receiving a message, or executing an application.

4. The electronic device of claim 1, wherein the controller is further configured to control the electronic device to: discover other electronic devices near the electronic device using the short-range communication unit; pair with the discovered other electronic devices using the short-range communication unit; and display the paired other electronic devices in the list on the display unit.

5. The electronic device of claim 1, wherein the controller is further configured to determine whether or not the priority corresponds to the event; and control the electronic device to transmit the data regarding the event to one of the two or more other electronic devices of a first priority from the priority using the short-range communication unit.

6. The electronic device of claim 5, wherein the controller is further configured to control the electronic device to:
    identify whether the one of the two or more other electronic devices of the first priority transmits a response to the data within a predetermined amount of time using the short-range communication unit; and
    when the one of the two or more other electronic devices of the first priority does not transmit the response within a predetermined amount of time, transmit the data regarding the event to another of the two or more electronic devices of a second priority from the priority using the short-range communication unit.

7. The electronic device of claim 1, wherein the controller is further configured to control the electronic device to identify whether or not other electronic devices included in the priority are paired using the short-range communication unit, and exclude the other electronic devices which are not paired from the priority.

8. A method for transmitting data in an electronic device, the method comprising:
    causing the electronic device to simultaneously pair with two or more other electronic devices;
    receiving a first input for selecting a priority configuration, wherein the priority configuration is based on at least one of a user's circumstances, contact information, or an application executing in the electronic device;
    receiving a second input for selecting an item corresponding to the selected priority configuration;
    displaying a list of the two or more other electronic devices;
    receiving a third input for selecting one of the two or more other electronic devices;
    setting a priority, based on the third input, prioritizing the two or more other electronic devices for transmission of data to the two or more other electronic devices; and
    transmitting data regarding an event to at least one of the two or more other electronic devices based on the priority.

9. The method of claim 8, wherein the user's circumstances include at least one of a study mode, a driving mode, a dating mode, an exercising mode, a sleeping mode, or a conference mode.

10. The method of claim 8, wherein the event includes at least one of receiving a call, receiving a message, or executing an application.

11. The method of claim 8, wherein the displaying of the list of the two or more other electronic devices comprises:
    discovering other electronic devices near the electronic device;
    pairing with the other discovered electronic devices; and
    displaying the other paired electronic devices in the list.

12. The method of claim 8, wherein the transmitting of the data regarding the event comprises:
    determining whether or not the priority corresponds to the event; and transmitting the data regarding the event to one of the two or more other electronic devices of a first priority from the priority.

13. The method of claim 12, further comprising:
identifying whether the one of the two or more other electronic devices of the first priority transmits a response to the data within a predetermined amount of time; and
when the one of the two or more other electronic devices of the first priority does not transmit the response within a predetermined amount of time, transmitting the data regarding the event to another of the two or more electronic devices of a second priority from the priority.

14. The method of claim 8, further comprising reconfiguring the priority.

15. The method of claim 14, wherein the reconfiguring of the priority comprises:
identifying whether or not other electronic devices included in the priority are paired; and
excluding the other electronic devices that are not paired from the priority.

16. A non-transitory computer-readable recording medium storing instructions to perform a data transmission method of an electronic device, the data transmission method comprising:
causing the electronic device to simultaneously pair with two or more other electronic devices;
receiving a first input for selecting a priority configuration, wherein the priority configuration is based on at least one of a user's circumstances, contact information, or an application executing in the electronic device;
receiving a second input for selecting an item corresponding to the selected priority configuration;
displaying a list of the two or more other electronic devices;
receiving a third input for selecting one of the two or more other electronic devices;
setting a priority, based on the third input, prioritizing the two or more other electronic devices for transmission of data to the two or more other electronic devices; and
transmitting data regarding an event to at least one of the other electronic devices based on the priority.

17. An electronic device comprising:
an input unit;
a display unit;
a communication unit; and
a controller configured to:
cause the electronic device to pair together with two or more other electronic devices using the communication unit,
receive a first input for selecting a priority configuration through the input unit, wherein the priority configuration is based on at least one of a user's circumstances, contact information, or an application executing in the electronic device,
receive a second input for selecting an item corresponding to the selected priority configuration through the input unit,
display a list of the two or more other electronic devices in the display unit,
receive a third input for selecting one of the two or more other electronic devices through the input unit,
set a priority, based on the third input, prioritizing the two or more other electronic devices for transmission of data to the two or more other electronic devices, and
transmit data regarding an event to at least one of the two or more other electronic devices based on the priority using the communication unit.

* * * * *